United States Patent [19]

Oslin

[11] Patent Number: 4,835,369
[45] Date of Patent: May 30, 1989

[54] JACKETED KETTLE WITH AGITATOR

[75] Inventor: G. Robert Oslin, Chicago, Ill.

[73] Assignee: Groen/A Dover Industries Company, Elk Grove Village, Ill.

[21] Appl. No.: 140,111

[22] Filed: Dec. 30, 1987

[51] Int. Cl.⁴ .......................... H05B 3/78; B01F 7/20
[52] U.S. Cl. ...................... 219/439; 366/97; 366/295; 366/312; 219/430
[58] Field of Search ............... 219/439, 430, 420, 421; 366/149, 295, 293, 73, 312

[56] References Cited

U.S. PATENT DOCUMENTS

| | | | |
|---|---|---|---|
| 60,652 | 12/1866 | Talbott | 366/185 |
| 177,888 | 5/1876 | Rogers | 366/343 |
| 223,753 | 1/1980 | Packer | 366/343 |
| 499,890 | 6/1893 | Savage | 366/185 |
| 503,577 | 8/1893 | Burnham | 366/195 |
| 811,145 | 1/1906 | Higgins | 366/312 |
| 817,844 | 4/1906 | Gilbert | 366/314 |
| 925,038 | 6/1909 | Schmitz | 366/185 |
| 1,715,035 | 5/1929 | Hoyt | 219/420 |
| 2,027,203 | 1/1936 | Schneider | 366/312 |
| 2,207,884 | 7/1940 | Holmen | 366/195 |
| 2,236,837 | 4/1941 | Rimmel | 219/430 |
| 2,557,622 | 6/1951 | Trier | 165/72 |
| 3,045,869 | 7/1962 | Rodth et al. | 366/195 |
| 3,156,451 | 11/1964 | Waas | 366/314 |
| 3,157,774 | 11/1964 | Moore | 219/421 |
| 3,390,868 | 7/1968 | Kaufman | 366/343 |
| 3,921,228 | 11/1975 | Klauk et al. | 366/314 |
| 3,945,309 | 3/1976 | Moran | 366/312 |
| 4,551,026 | 11/1985 | Cristante | 366/312 |
| 4,655,605 | 4/1987 | Cipelletti | 366/312 |

FOREIGN PATENT DOCUMENTS

| | | | |
|---|---|---|---|
| 1062868 | 8/1959 | Fed. Rep. of Germany | 366/312 |
| 731610 | 9/1932 | France | 366/293 |
| 1267657 | 6/1961 | France | 366/97 |
| 304595 | 1/1955 | Switzerland | 219/430 |

Primary Examiner—Teresa J. Walberg
Attorney, Agent, or Firm—Welsh & Katz, Ltd.

[57] ABSTRACT

A jacketed kettle on a trunnion mount is tiltable for pouring a contained liquid. The inside of the kettle has a central substantially cylindrical portion that permits an agitator to be driven from the underside of the kettle while making a liquid seal above the contained liquid surface. The jacket may contain water which is heated by an immersed thermostatically controlled electric heater. A sight glass mounted into the outside of the kettle provides a visual indication of the water level in the jacket. Continuation of the outside of the kettle below the jacket provides a covered enclosure for a motor that drives the agitator by means of a gear drive unit, and for necessary electrical connectors. A symmetric agitator provides for wiping at or near the kettle inside surface and the surface of the central cylindrical portion of the kettle, and for mixing liquid within the kettle. The kettle is balanced for tipping by a lever and for return to the vertical position upon release of the lever. In an alternate embodiment, a symmetrical agitator provides scraping contact with the inside surface of the kettle.

20 Claims, 3 Drawing Sheets

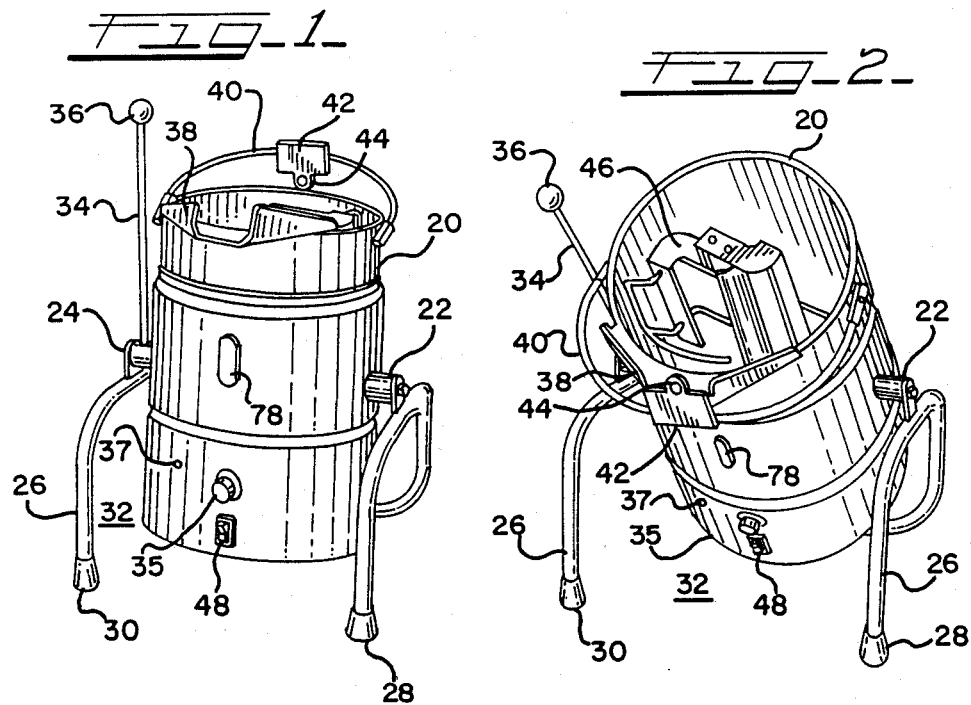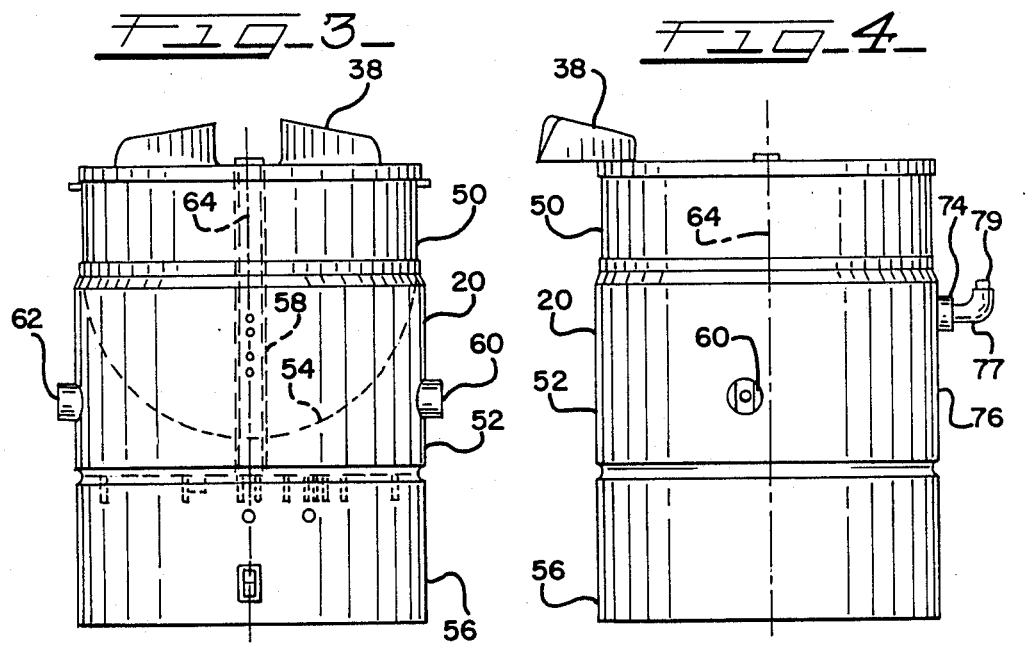

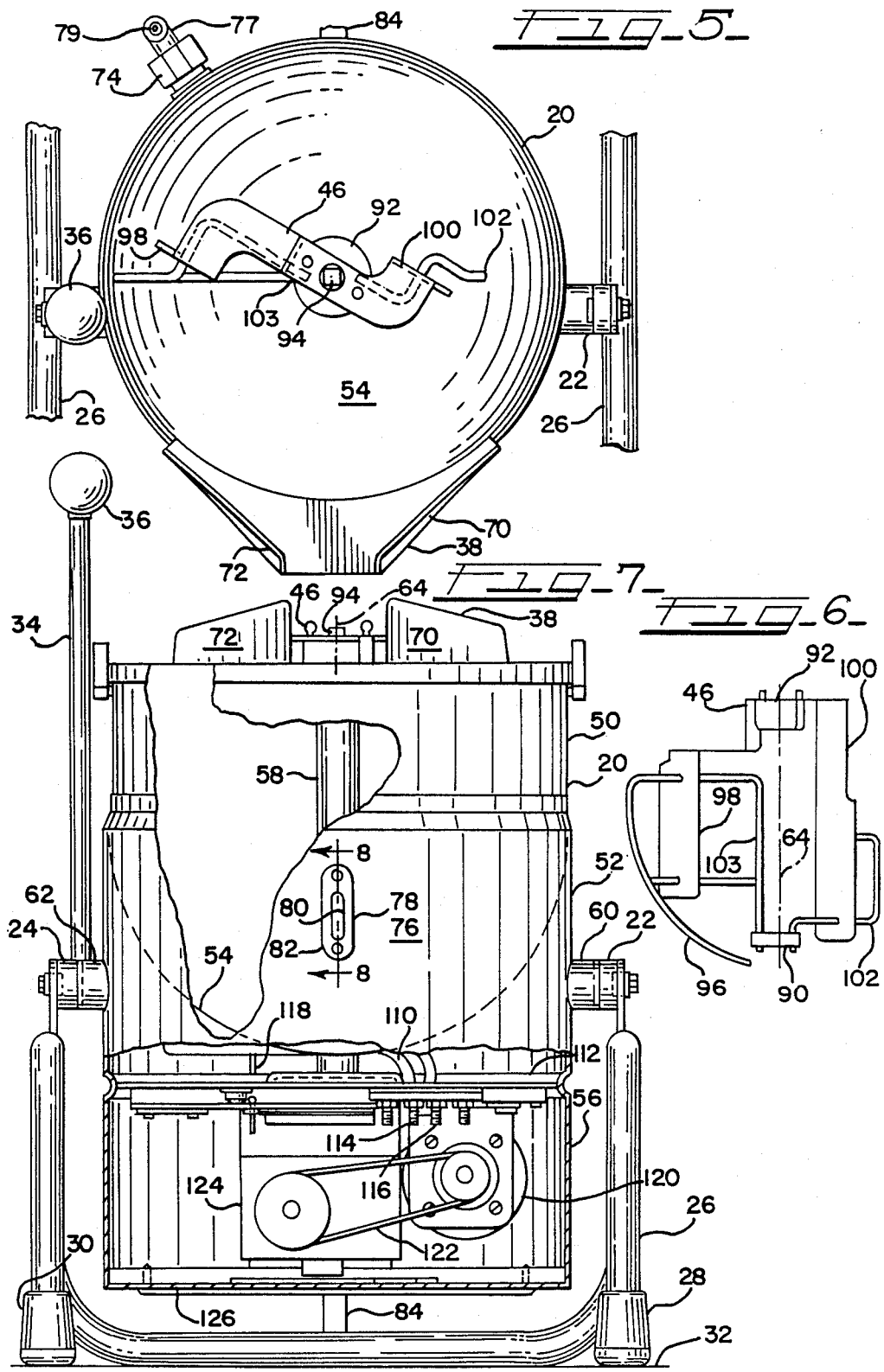

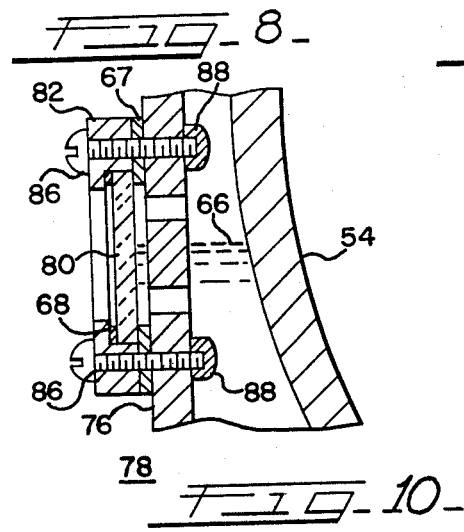
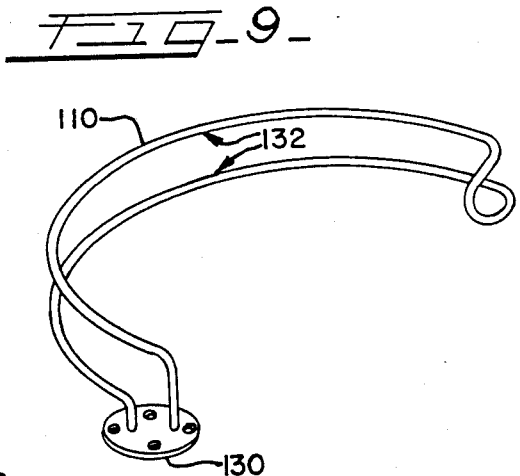
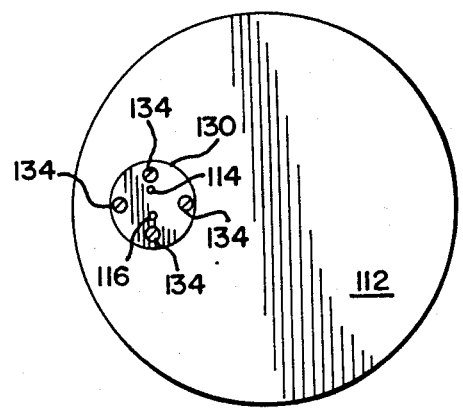
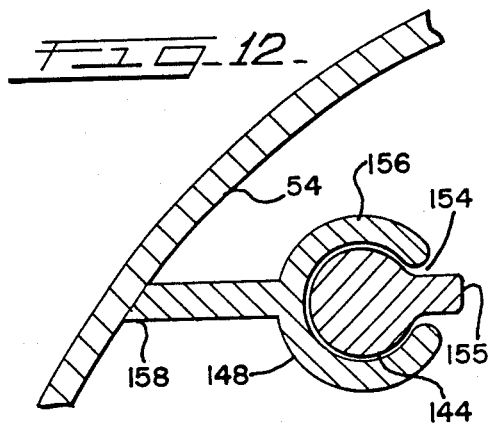
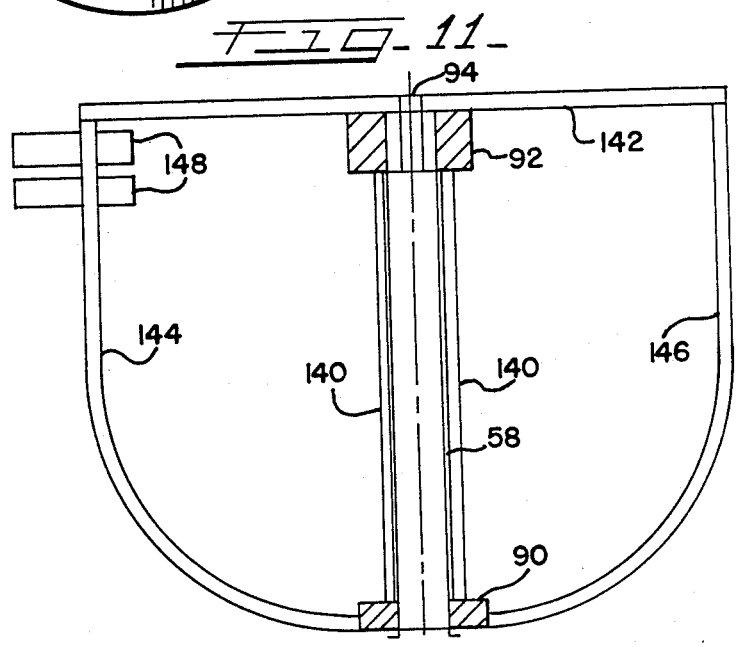

4,835,369

JACKETED KETTLE WITH AGITATOR

BACKGROUND OF THE INVENTION

This invention relates to jacketed open kettles. In particular, it is a jacketed open kettle with an agitator for heating and mixing fluids, especially viscous fluids. It is of particular use for heating and pouring soup and confectionery products.

Many applications call for the use of open kettles for mixing viscous fluids. When it is desired to tilt such open kettles to extract the viscous processing fluids therefrom, then a powered agitator in such a kettle may present an obstruction to be dealt with. An earlier example of an approach to such a problem is given in Savage, U.S. Pat. No. 499,890, entitled "Apparatus for Operating Confectionery Kettles". This patent teaches a confectionery kettle on a trunnion mount for pouring. An agitator system in the kettle is driven from the top by a gearing arrangement that includes a pair of spur gears. The gears are disengaged when the kettle is tilted, and they are returned to engagement when the kettle is restored to its upright position. Two particular problems with this structure are the exposure of the gears when the kettle is tipped and the fact that the agitator cannot be driven when the kettle is in any position except its vertical position.

A second approach to the problem of making a tiltable kettle with a driven agitator is sometimes used in mixers for bread dough and in soup kettles. This is to mount an agitator drive to the top of the kettle by a spider or the like with an electric motor fixed in position to drive the agitator. The electric motor is then tilted along with the kettle to pour substances from the kettle. This arrangement has two disadvantages. One is the fact that such an exposed motor needs shielding for use in any application involving food in order to protect the food from contamination. In applications that do not involve food, the motor must still be shielded to protect operators from unwanted contact with the motor and associated speed-reduction gears and the like. The weight of the motor and its shielding leads to a second disadvantage, which is that the kettle tends to be top-heavy.

Another approach to providing a tiltable agitated kettle for soup, fudge and the like is to support an agitator mechanism in the kettle by a spider or equivalent device that is connected to or rests on the upper lip of the kettle, and to have a drive mechanism that can be swung into engagement to drive the agitator and lifted clear to free the kettle for tilting. This has the disadvantages of a certain amount of complexity in operation and also of making it impossible to agitate the fluids that are being poured from the kettle.

SUMMARY OF THE INVENTION

It is an object of the present invention to provide an improved tiltable kettle with an agitator.

It is a further object of the present invention to provide a jacketed kettle with an agitator that is driven from below the kettle.

It is a further object of the present invention to provide a jacketed kettle with an agitator and with electric heating elements that are replaceable.

It is a further object of the present invention to provide a tiltable jacketed kettle that is relatively simple to manufacture.

Other objects will become apparent in the course of a detailed description of the invention.

A jacketed kettle is mounted on a trunnion mount so that it can be tilted to pour. The inside of the kettle is formed with a central substantially cylindrical portion that permits an agitator to be driven from the underside of the kettle while making a liquid seal above the surface of any liquids in the kettle. The jacket is preferably vented to the atmosphere and is heated by an immersed electrical heater that is controlled by a thermostat. A sight glass mounted into the outside of the kettle provides a visual indication of a water level in the jacket. Continuation of the outside of the kettle below the bottom of the water jacket provides a covered enclosure for a motor that drives the agitator, for a gear drive unit, and for necessary electrical connectors. An asymmetric agitator design provides for wiping at or near the surface of the inside of the kettle and also the surface of the central portion of the kettle, as well as for mixing of the fluid in the kettle. In the alternative, a symmetric agitator provides for scraping of the outer surface of the inside of the kettle as well as for mixing of the contents of the kettle. The kettle balanced so that it is readily tipped by means of a tipping lever but is weighted to return to the vertical position, where it is supported on its tilting trunnions and a single foot. In the upright position, the foot engages a portion of a stand, which is preferably bent from a single tube. The stand supports the trunnion mount for the kettle. In an alternate embodiment, a symmetrical agitator provides scraping contact with the surface of the inside of the kettle.

BRIEF DESCRIPTION OF THE DRAWINGS

FIG. 1 is a perspective view of the jacketed kettle of the present invention in an upright position.

FIG. 2 is a perspective view of the jacketed kettle of the present invention in a tilted position.

FIG. 3 is a front view of the kettle of the present invention.

FIG. 4 is a side view of the kettle of the present invention.

FIG. 5 is a top view of the kettle of the present invention including the agitator.

FIG. 6 is a side view of the agitator of FIG. 5.

FIG. 7 is a partially cutaway front view of the jacketed kettle.

FIG. 8 is a partial sectional side view of the sight glass along section lines 8—8 of FIG. 7.

FIG. 9 is a perspective view of the heating element 110 of FIG. 7.

FIG. 10 is a bottom view of the bottom plate 112 of FIG. 7.

FIG. 11 is a side view, shown partially in section, of an alternate embodiment of an agitator.

FIG. 12 is a top view of a scraping finger for the agitator of FIG. 11.

DETAILED DESCRIPTION OF THE INVENTION

FIG. 1 is a perspective view of the jacketed kettle of the presented invention, and FIG. 2 is a perspective view of the kettle in a tilted position. In FIGS. 1 and 2, a kettle 20 is mounted on trunnions 22 and 24. The trunnions 22 and 24 are affixed to a stand 26, which is preferably formed from a single piece of tubing as in the embodiment shown in FIGS. 1 and 2. Crutch tips 28 and 30 protect a surface 32 on which the stand 26 is placed, and also provide traction to hold the stand 26 in place when the kettle 20 is tipped. A lever 34, terminated in a knob 36, enables an operator to tilt the kettle 20 without touching any portions of it that may be hot. The lever 34 is shown at the left side of the kettle 20 in FIGS. 1 and 2, but the trunnions 22 and 24 are adapted to mount the lever 34 on either side. This change can be made during manufacturing or by a mechanic on a completed kettle. A sight glass 78 shows the level of water that is heated under the control of an off-on thermostatic switch 35. A pilot light 37 shows that the switch 35 is on.

A pouring spout 38 directs the flow of foodstuffs or other substances in the kettle 20 when the kettle 20 is tipped for pouring. A bail 40 is hinged and sized to place a stop plate 42 over the pouring spout 38. This enables an operator to control the flow with precision when pouring and also helps to cut drips. A handle 44 in the stop plate 42 makes it easy for an operator to use the stop plate 42. An agitator 46 is shown in the tilted view of FIG. 2. The agitator 46 may be left in place or removed by an operator when pouring. If the agitator 46 is left in place, it may be operated during pouring by operating a switch 48 if the operator desires to do so. The agitator 46 may also be removed to be replaced with a different agitator.

FIG. 3 is a front view and FIG. 4 is a side view of the kettle 20. In FIGS. 3 and 4, an upper portion 50 of the kettle 20 is not jacketed. A middle portion 52 is jacketed to place heated water in contact with the inside surface 54 of the kettle 20. A lower portion 56 covers and protects electrical contacts and an agitator drive unit that will be shown later. A central shaft cover 58 is connected through the inside surface 54 and extends to or above the top of the upper portion 50 of the kettle 20. The central shaft cover 58 will be seen later to provide support at the bottom for the rotation of an agitator and also to provide a rotating seal that is above the level of any liquid in the kettle 20. The pouring spout 38 is affixed at the top of the upper portion 50, and a pair of tilting supports 60 and 62 hold the kettle 20 in contact with the trunnions 22 and 24 of FIGS. 1 and 2. It can be seen from FIG. 4 that the tilting supports 60 and 62 are preferably placed so that their axis is displaced from the center line 64 in the direction of the pouring spout 38. This assures that the kettle 20 is overbalanced to return to its upright position after being tipped. A water connection 74 is provided to fill a water jacket 76.

In the embodiment of FIG. 4, the water connection compromises a street elbow 77 with a vented plug 79. This is appropriate for a water jacket 76 that is operated at atmospheric pressure. In such a kettle 20, the water level is maintained in contact with the inside surface 54, as described earlier. The kettle 20 can also be used with a pressurized water jacket 76. In this case, the water level would be maintained below the bottom of the inside surface 54 to permit heat exchange to occur between steam and the inside surface 54. This would require lowering the sight glass 78 to a level below the bottom of the inside surface 54 and also replacing the vented plug 79 with a pressure relief device.

FIG. 5 is a top view of the kettle 20 of FIGS. 1 and 2, FIG. 6 is a detailed side view of the agitator 46 of FIG. 5, and FIG. 7 is a cut-away front view of the kettle 20. Elements in FIGS. 5, 6 and 7 are numbered to coincide with the same elements in FIGS. 1-4. In FIG. 7, the agitator 46 is cut away to show the central shaft cover 58. The bail 40 and stop plate 42 have also been removed to increase clarity.

In FIGS. 5 and 7, the pouring spout 38 is seen to have wings 70 and 72 that are preferably tilted from the vertical in the direction of the kettle 20 to assist in pouring. The water connection 74 permits an operator to remove the vented plug 79 to introduce water into the water jacket 76 through the street elbow 77 to a level determined by the sight glass 78. The water connection 74 is preferably left open or equipped with a venting cap so as to prevent pressure build up in the water jacket when the water jacket 76 is not pressurized. An effective way of installing the sight glass 78 is to place a gasketed glass 80 that is maintained in place by a retaining plate 82. This permits a direct look at the water level in the water jacket 76 and protects the sight glass 78 from damage in comparison with the use of externally attached water sight glasses. A foot 84 rests on the stand 26 when the kettle is in an upright position.

As seen in FIGS. 5 and 6, the agitator 46 includes a collar 90 that is hollow so as to be supported by and rotate about the central shaft cover 58. A hub 92 of the agitator 46 is driven by a shaft 94 that extends inside the central shaft cover 58. The agitator 46 includes an outer wiper 96 that is sized and shaped to clear the inside surface 54 of the kettle 20. The outer wiper 96 may be designed to make physical contact with (scrape) the inside surface 54 or it may be designed to clear (wipe) the inside surface 54. An outer paddle 98 stirs materials in the kettle 20 near the inside surface 54. Stirring close to the central shaft cover 58 is provided by an inner plate or paddle 100, a stirring rod 102 and an inner wiper 103. The purpose of the inner wiper 103 is, to wipe the central shaft cover 58. The inner paddle 100 is preferably a continuation of the outer paddle 98, formed of a single piece of metal. The agitator 46 is preferably made so that it can be removed from the central shaft cover 58 by an operator without the use of tools. This is done by making the collar 90 of nylon or the like that is sized to make a rotating fit about the central shaft cover 58. The hub 92 is also typically of nylon or the like, also making a rotating fit about the central shaft cover 58, and connected to a continuation of the outer paddle 98 that engages the shaft 94 to rotate the agitator 46. The asymmetry of the agitator 46 facilitates mixing. Its shape is particularly useful in mixing fudge containing nuts. Much of the agitator 46 is of wire-form construction, meaning that it is made of bent rods that are welded to a metal plate comprising the outer paddle 98 and the inner plate 100. This construction minimizes manufacturing costs.

The lower portion of the kettle 20 is cut away in FIG. 7 to show a heating element 110 that is immersed in water in the water jacket 76 and is brought out through the watertight bottom plate 112 of the water jacket 76 to a pair of electrical terminals 114 and 116. The heating element 110 will be shown later to be readily removable for replacement. A temperature probe 118 provides information to enable the control of water temperature by the use of a conventional bimetallic thermostat (not shown) or by a resistive-thermal-device (RTD) controller. If an RTD controller is used, it will preferably include a relay to control power to the heating element or elements. An electric motor 120 is mounted in the lower portion 56 of the kettle 20. The motor 120 is connected by a timing belt 122 or the like to a reduction gear unit 124 that drives the shaft 94. A bottom cover 126 encloses the terminals 114 and 116, the motor 120, and the reduction gear unit 124 to protect these components from damage by contact with liquids or the like in the environment in which the kettle 20 is being used. The bottom cover 126 comprises a labyrinth to permit air access while protecting against liquid splashes. This also serves to protect an operator from contact with the electric motor 120 and the reduction gear unit 124.

The features shown and described here provide a jacketed kettle with an agitator 46 that can be left in place or removed when the kettle is tilted for pouring. If the agitator 46 is left in place when the kettle 20 is tilted for pouring, then the operator may choose either to operate the agitator 46 or to switch it off. The motor 120 and reduction gear unit 124 tilt with the kettle 20 and need not be removed or swung inside to ready the kettle 20 for pouring. The immersed electrical heating element 110 provides means for controlling the temperature of water in the water jacket 76, and the sight glass 78 provides a means for determining the water level in the water jacket 76. Extension of the central shaft cover 58 so that it is well above the liquid level reduces problems of maintaining a seal between the rotating shaft 94 and the central shaft cover 58.

FIG. 8 is a sectional side view through the sight glass 78 of FIG. 7. In FIG. 8, a portion of the outer surface of the water jacket 76 provides a shiny background against which to view the water level 66. The glass 80 is held against the water jacket 76 through a gasket 67. A shim 68 separates the glass 80 from the retaining plate 82, which is secured by a pair of machine screws 86 to a pair of weld nuts 88. The resulting sightglass 78 is easy to assemble, is removable for cleaning if necessary, and is protected against damage by projecting a minimum distance from the kettle 20.

FIG. 9 is an isometric view of the heating element 110 of FIG. 7. The element 110 of FIG. 9 spans more than 180° about the centerline of the kettle 20, and is thus especially appropriate for use in a single-phase electrical configuration. For three-phase use, the element 110 would span a shorter arc, preferably overlapping with other such elements 110 spaced 120° apart. The element 110 comprises a single immersion heater connected to a plate 130 that makes a gasketed connection to the bottom plate 112. The distance 132 in FIG. 9 is less than the diameter or long dimension of the opening covered by the plate 130, allowing the heating element 110 to be inserted into and removed from the interior of the water jacket 76 of FIG. 7. Replaceability of such heating elements 110 contributes to operating economy of the kettle 20.

FIG. 10 is a bottom view of the bottom plate 112 of FIG. 7. In FIG. 10, the plate 130 of FIG. 9 is connected to the bottom plate 112 by four screws 134. Two terminals 114 and 116 are brought out to connect electric power through the plate 130 to the heating element 110. The bottom plate 112 of FIG. 10 is designed for single-phase operation. If it were designed for three-phase operation, two more plates 130, spaced at approximately 120° intervals, would allow for connection of three heating elements 110.

FIG. 11 is a side view of an alternate embodiment of an agitator 46, and FIG. 12 is a top sectional view of a scraping finger of FIG. 11. In FIGS. 11 and 12, the central shaft cover 58 supports a collar 90 that is preferably of nylon. A hub 92, also of nylon, is connected to the collar 90 by a pair of rods 140 that also provide mixing near the central shaft cover 58. A top connector 142 provides a driving connection for the shaft 94 and also supports two finger rods 144 and 146. The finger rods 144 and 146 provide some mixing and also support a plurality of fingers 148. Only two such fingers 148 are shown in FIG. 11 for clarity, but they may be inserted all along the finger rods 144 and 146 to provide scraping action on the inside surface 54 of the kettle 20. Such scraping action improves heat transfer from the water jacket 76. FIG. 12 is a top view of the finger 148, showing an insertion cutout 154 that engages a detent 155 in the finger rod 144. An annular collar 156 permits limited rotation about the finger rod 144 or 146 of FIG. 11, and a scraping blade 158 makes contact with the inside surface 54. The detent 155 does not extend to the top connector 142, but stops short to allow placement and removal of the fingers 148.

In an embodiment of the invention that has been built and tested, the capacity of the kettle 20 was twenty quarts. The heating element 110 was controlled thermostatically to three selected heat levels, 120° F., 140° F., and 160° F. by an RTD controller that operated a relay to control power to the heating element. The electric motor 120 was a 110-volt single-phase capacitor-start motor with a second capacitor in the running winding to correct the power factor close to unity. This minimized heating in the enclosed space that contained the motor 120 and the reduction gear unit 124. Kettles 20 may readily be made for the practice of the present invention in size ranges up from ten quarts to any size and the electric motor 120 may be selected to operate on 240 volts. The heating element 110 may be disposed in the water as convenient. In the embodiment that was built, the heating element 110 was a single U-shaped electric heating element in which the element was bent substantially into an arc of a circle that enclosed approximately ¾ of the central shaft cover 58 and was concentric with it.

The description of specific embodiments of the present invention is intended to set forth the best mode known to the inventor for the practice of the invention. It should be taken as illustrative and not as limiting, and the scope of the invention should be limited only by the appended claims.

What is claimed is:

1. A kettle for heating, mixing and pouring contained fluids comprising:
  (a) an inside wall shaped to contain fluids;
  (b) a central shaft cover connected to the inside wall and extending above a surface of a contained fluid when the inside wall is in an upright position;
  (c) a heating jacket encompassing a lower portion of the inside wall and forming with the inside wall and the central shaft cover a closed container for a heating fluid to contact the inside wall;
  (d) a shaft disposed inside and concentric with the central shaft cover, the shaft extending from above the surface of a contained fluid to below the jacket;
  (e) an agitator removably connected to the shaft and disposed to rotate about the central shaft cover to mix a contained fluid;
  (f) means for heating a heating fluid in the jacket;
  (g) means disposed below the jacket and connected to the shaft for rotating the shaft about its major axis; and
  (h) means for supporting the inside wall in an upright position to retain a contained fluid and for tilting the inside wall to pour out said contained fluid.

2. The kettle of claim 1 wherein the means for heating comprises an electric heater disposed to be immersed in a heating fluid in the jacket.

3. The kettle of claim 2 wherein the electric heater is removably mounted in the jacket.

4. The kettle of claim 2 comprising in addition a thermostatic controller connected to the electric heater and coupled thermally to the jacket to control electric energy to the electric heater in response to a detected temperature in the jacket.

5. The kettle of claim 2 comprising in addition a sight glass mounted in the jacket to permit visual monitoring of a level of heating fluid in the jacket against the inside wall when the inside wall is in the upright position.

6. The apparatus of claim 1 wherein the means for rotating the shaft comprises:
- an electric motor mounted in a fixed relationship to the inside wall;
- a reduction gear unit mounted in a fixed relationship to the inside wall and rotatably connected to the shaft; and
- a belt connecting the electric motor to the reduction gear unit to operate the reduction gear and thereby rotate the shaft.

7. The kettle of claim 1 wherein the means for supporting and tilting the inside wall comprise:
- a stand;
- a plurality of trunnion mounts connected to the stand on a common axis; and
- a plurality of tilting supports connected to the trunnion mounts and disposed in a fixed relationship to the inside wall to support the inside wall in an upright position and in a tilted position about the common axis.

8. The kettle of claim 7 wherein the tilting supports are disposed with respect to the inside wall so that the inside wall maintains the upright position unless it is held in the tilted position.

9. The kettle of claim 8 comprising in addition a lever disposed in a fixed relationship with the inside wall to permit manual tilting of the inside wall about the common axis of the trunnion mounts.

10. The kettle of claim 1 wherein the agitator comprises an outer wiper and an outer paddle for mixing a contained fluid near the inside wall, and an inner wiper and an inner paddle for mixing said contained fluid near the central shaft cover.

11. The kettle of claim 1 wherein the agitator comprises in addition a hub that is connected to the shaft and a collar that encircles the central shaft cover to thereby support and drive the agitator in rotation about the central shaft cover.

12. The kettle of claim 11 wherein said hub is connected to the top of the shaft.

13. A kettle for heating, mixing and pouring contained fluids comprising:
(a) an inside wall shaped to contain fluids;
(b) a central shaft cover connected to the inside wall and extending above a surface of a contained fluid when the inside wall is in an upright position;
(c) a heating jacket encompassing a lower portion of the inside wall and forming with the inside wall and the central shaft cover a closed container for a heating fluid to contact the inside wall;
(d) a shaft disposed inside and concentric with the central shaft cover, the shaft extending from above the surface of a contained fluid to below the jacket;
(e) an agitator removably connected to the shaft and disposed to rotate about the central shaft cover to mix a contained fluid;
(f) means for heating a heating fluid in the jacket;
(g) means disposed below the jacket and connected to the shaft for rotating the shaft about its major axis;
(h) means for supporting the inside wall in an upright position to retain a contained fluid and for tilting the inside wall to pour out said contained fluid;
(i) a pouring spout connected to the inside wall to direct a flow of a contained fluid when the inside wall is tilted;
(j) a bail movably connected to the inside wall; and
(k) a stop plate connected to the bail and disposed to swing so as to cover the pouring spout to control flow of the contained fluid and to cut off drips from the pouring spout.

14. The kettle of claim 13 wherein the agitator comprises an outer wiper and an outer paddle for mixing a contained fluid near the inside wall, and an inner wiper and an inner paddle for mixing said contained fluid near the central shaft cover.

15. The kettle of claim 14 wherein the agitator further comprises a hub that is connected to the shaft and a collar that encircles the central shaft cover to thereby support and drive the agitator in rotation about the central shaft cover.

16. A kettle for heating, mixing and pouring contained fluids comprising:
(a) an inside wall shaped to contain fluids;
(b) a central shaft cover connected to the inside wall and extending above a surface of a contained fluid when the inside wall is in an upright position;
(c) a heating jacket encompassing a lower portion of the inside wall and forming with the inside wall and the central shaft cover a closed container for a heating fluid to contact the inside wall;
(d) a shaft disposed inside and concentric with the central shaft cover, the shaft extending from above the surface of a contained fluid to below the jacket;
(e) an agitator removably connected to the shaft and disposed to rotate about the central shaft cover to mix a contained fluid, said agitator comprising an outer wiper and an outer paddle for mixing a contained fluid near the inside wall, an inner wiper and an inner paddle for mixing said contained fluid near the central shaft cover, a hub that is connected to the shaft for driving the agitator in rotation about the central shaft cover, and a collar that encircles the central shaft cover below the hub;
(f) means for heating a heating fluid in the jacket;
(g) means disposed below the jacket and connected to the shaft for rotating the shaft about its major axis; and
(h) means for supporting the inside wall in an upright position to retain a contained fluid and for tilting the inside wall to pour out said contained fluid.

17. The kettle of claim 16 wherein the hub is connected to the top of the shaft.

18. The kettle of claim 16 wherein the means for supporting and tilting the inside wall comprises:
- a stand;
- a plurality of trunnion mounts connected to the stand on a common axis; and
- a plurality of tilting supports connected to the trunnion mounts and disposed in a fixed relationship to the inside wall to support the inside wall in an upright position and in a tilted position about the common axis.

19. The kettle of claim 18 wherein the tilting supports are disposed with respect to the inside wall so that the inside wall maintains the upright position unless it is held in the tilted position.

20. The kettle of claim 19 comprising in addition a lever disposed in a fixed relationship with the inside wall to permit manual tilting of the inside wall about the common axis of the trunnion mounts.

* * * * *